2 Sheets--Sheet 1.

C. G. WILSON.
Cotton-Seed Planters and Guano-Distributors.

No. 143,211. Patented September 23, 1873.

WITNESSES:
Jas. L. Ewin
Walter Allen

INVENTOR:
Carlos G. Wilson
By Knight Bro. Attorneys.

2 Sheets--Sheet 2.
C. G. WILSON.
Cotton-Seed Planters and Guano-Distributors.
No. 143,211. Patented September 23, 1873.
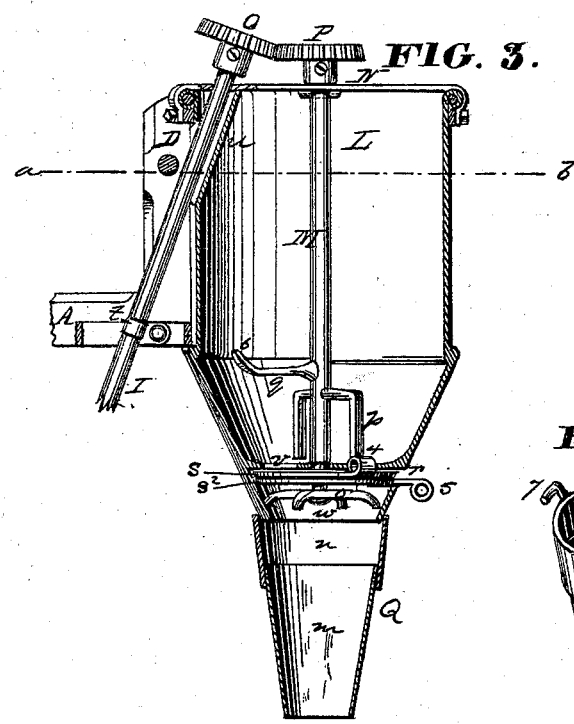
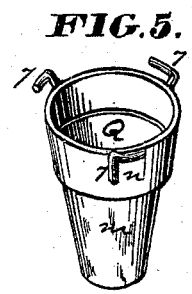
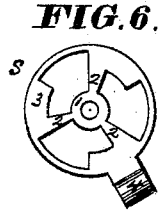
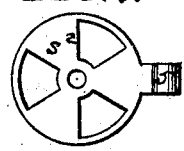
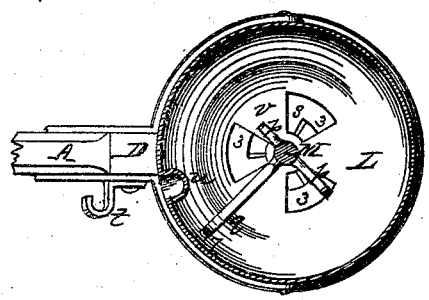
WITNESSES:
Jas L. Gwin
Walter Allen
INVENTOR:
Carlos G. Wilson
By Knight Bro. Attorneys.

UNITED STATES PATENT OFFICE.

CARLOS G. WILSON, OF MILLEDGEVILLE, GEORGIA.

IMPROVEMENT IN COTTON-SEED PLANTERS AND GUANO-DISTRIBUTERS.

Specification forming part of Letters Patent No. 143,211, dated September 23, 1873; application filed August 12, 1873.

*To all whom it may concern:*

Be it known that I, CARLOS G. WILSON, of Milledgeville, in the county of Baldwin, Georgia, have invented a certain Improved Cotton-Seed Planter and Guano-Distributer, of which the following is a specification:

This invention relates, primarily, to the application of my hand-sower, patented December 10, 1872, (United States Letters Patent No. 133,911,) to a draft implement, and to improvements on the same.

The present machine has a beam, handles, standards and share similar to those of a common shovel-plow. In rear of the shovel a driving-wheel is journaled so as to run in the furrow. The hopper containing the feeding and regulating devices is arranged behind this, and the upper end of the feed-shaft is connected by gearing with the driving-wheel. The furrow is closed by a pair of coverers.

The first part of the invention consists in coverers of peculiar construction, the same being weighted and so shaped as to penetrate the soil to a considerable depth, and to gather the same in a loose ridge over the seed. The second part of the invention consists in mechanism for simultaneously lifting the coverers and disconnecting the feed-shaft from the driving-wheel by either hand. The third part of the invention consists in an improved guano-sowing slide having a bearing on the axial feed-shaft.

Figure 1:
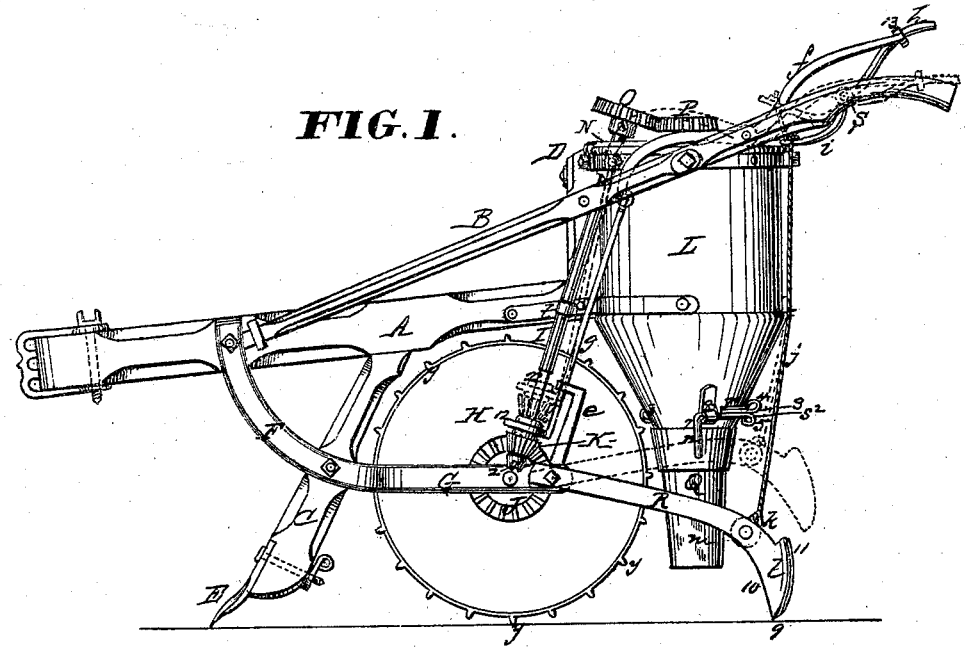
Figure 2:
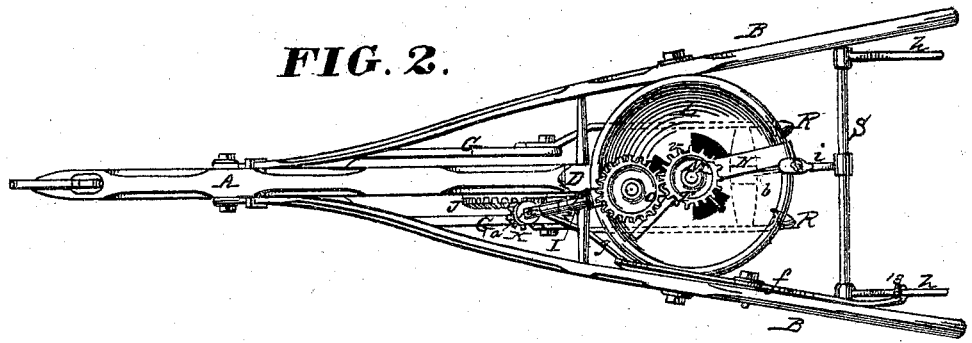

Figure 1 is a side elevation of the improved planter and distributer. The full lines represent the parts in working position. The dotted lines represent the positions of the coverers and the clutch-pinion of the driving-gear when the machine is rendered inoperative, for turning and for traveling to and from work. Fig. 2 is a plan view of the machine. Fig. 3 is a vertical longitudinal section of the hopper and its appurtenances on a larger scale. Fig. 4 is a horizontal section of the same on the line *a b*, Fig. 3. Fig. 5 is a perspective view of the discharge-spout. Figs. 6 and 7 are plan views of rotary slides for regulating the discharge.

Referring to the drawing, A represents a draft-beam; B B, handles; C D, standards; and E, a furrowing-share, which parts may be of any approved construction. F F represent metallic braces supporting the share-standard C, and G G represent rearward extensions of the same. These are bent outward to accommodate a ground-wheel, H, between, and are perforated to form bearings for the axle of this wheel, and one is furnished with a step-bearing, *z*, for an inclined upright shaft, I. The ground-wheel has spurs *y* on its periphery, and a bevel-gear wheel, J, is attached to or carried by the same. The shaft I is constructed with a square lower end, *x*, and a sliding clutch-pinion, K, is mounted thereon so as to mesh with the wheel J or be disconnected therefrom, as illustrated in Fig. 1. A vertical hopper, L, is attached to the rear end of the beam A, and to the handles B, and to the vertical standard D, and thus supported. The upper part of this hopper is, by preference, cylindrical, and its bottom conical, terminating in an orifice, *w*, of proper size for the discharge of loosened cotton-seed in a sufficient quantity. A horizontal partition, *v*, near the lower end, forms the bottom of the seed or guano chamber, and a central perforation in the same constitutes a step-bearing for an axial feed-shaft, M. The upper end of this shaft is journaled in a perforation in a cross-bar, N, which also supports in like manner the upper end of the inclined shaft I, which is here connected to the feed-shaft by beveled gears O P. The inclined shaft extends through the hopper at one side where the hopper is furnished with a shield, *u*, to prevent the escape of seed. The object of thus arranging the shaft is to permit the employment of small and light gears, and to do this without employing an additional shaft and gearing. The inclined shaft has an intermediate bearing, *t*, at the beam, the same being so constructed as to prevent longitudinal displacement. The bottom *v* of the hopper has radial perforations, and beneath this a pair of rotary slides, *s s²*, are arranged to regulate the discharge. One of these, *s²*, is of common form, and serves simply to reduce the effective width of the perforations, or to wholly close the same. The other slide, *s*, is for reducing the radial length of the perforations to form central discharges of proper size for distributing guano. In order to give this slide a bearing on the feed-shaft, so as to facilitate its operation, it is provided with a central perforated hub, 1, and arms 2 to unite this with the rim, to which the effective lands 3 are necessarily attached. Handles 4 5 on the respective slides project through a slot, $r$, in the back of the hopper. The feed-shaft M carries above the bottom $v$ of the hopper a single stirring-finger, $q$, and a pair of guiding-fingers, $p$. Below the bottom it carries radial fingers $o$, to strike and loosen the discharged seed or guano. The single stirring-finger $q$ is arranged at the top of the conical portion of the hopper, and is constructed with an upturned outer end, 6. It operates to keep the material within the hopper loose and to prevent it from arching. By constructing and arranging the finger as above stated, any necessity for a series of stirring-fingers is obviated. The fingers $p$ operate in different vertical planes to carry the seed or guano from the lands of the bottom into the perforations. A spout, Q, conducts the seed or guano into the furrow, which is then filled with soil by coverers R R pivoted to the rear ends of the bars F G. The spout Q is constructed with an upper section, $n$, of metal, and a lower section, $m$, of leather, or equivalent flexible material, attached to the metallic ring $n$. Hooks 7 on the ring $n$ and eyes 8 on the hopper serve to attach the spout with sufficient security. In some cases the spout may be dispensed with. The shares L of the coverers R curve and taper downwardly and rearwardly to sharp entering-points 9. Their front edges 10 are sufficiently sharp to pass readily through the soil. Their rear edges 11 are bent inwardly. They consequently operate to move the soil laterally to a very small extent, penetrating to a considerable depth to secure the requisite quantity. The coverers are united by a heavy cross-bar, $k$, which operates as a weight to press them into the ground. To this a cord, $j$, is attached, and the coverers thus connected to an arm, $i$, of a rock-shaft, S, journaled between the handles and furnished with latch-levers $h$ adjacent to the ends of the handles. By this provision the operator may readily lift the coverers with either hand, using whichever one is not required for holding or guiding the implement. To simultaneously throw the clutch-pinion K out of mesh, it is connected by a rod, $g$, and lever $f$, to one of the latch-levers $h$. The rod $g$ is guided at its lower end by a bracket, $e$, and is attached to the pinion by a swivel-ring, 12. The lever $f$ terminates in a ring, 13, by which it embraces the latch-lever. The coverers being elevated and the feed-shaft stopped, as above described, the implement may be tipped back on its wheel H so as to clear the furrowing-share E from the ground, and thus readily turned or run to or from the field.

The machine obviously admits of considerable modification in mechanical details. The seed may be sown either rolled or unrolled. For sowing rolled seed the slide $s$ is employed, as with guano.

The following is claimed as new:

1. The coverers R, united by a weighted cross-bar, $k$, and having shares $l$, constructed as specified, for the purposes set forth.

2. The rock-shaft S, having the pair of latch-levers $h$, and arranged as described, in combination with the connections $i$ $j$ for lifting the coverers by either hand.

3. The combination of the rock-shaft S with its arm $i$ and latch-levers $h$ $h$, the cord $j$, lever $f$, and connecting-rod $g$, for simultaneously lifting the coverers and throwing the clutch-pulley out of mesh, as set forth.

4. The regulating-slide $s$, having the lands 3 for adapting the implement to sow guano or rolled seed, when the same is constructed with the hub 1 and arms 2, as described.

CARLOS G. WILSON.

Witnesses:
T. D. WRIGHT,
WM. S. McCOMB.